United States Patent [19]

Waldhauser et al.

[11] 4,406,980
[45] Sep. 27, 1983

[54] SPEED AND DIRECTION CONTROL MECHANISM

[75] Inventors: Steven J. A. Waldhauser; Richard D. Masbruch, both of Lewiston, N.Y.

[73] Assignee: Wetrok, Inc., Niagara Falls, N.Y.

[21] Appl. No.: 267,064

[22] Filed: May 26, 1981

[51] Int. Cl.³ .............................................. H02P 7/08
[52] U.S. Cl. .................................... 318/257; 200/157
[58] Field of Search ............... 318/139, 257, 291, 295, 318/301; 200/157, 158

[56] References Cited

U.S. PATENT DOCUMENTS

| | | | |
|---|---|---|---|
| 2,930,055 | 3/1960 | Fallen et al. ............................... 15/4 |
| 3,065,490 | 11/1962 | Arones .................................... 15/359 |
| 3,190,994 | 6/1965 | Becker et al. ......................... 200/157 |
| 3,260,826 | 7/1966 | Johnson ............................... 200/157 |
| 3,277,511 | 10/1966 | Little et al. ............................ 15/320 |
| 3,402,420 | 9/1968 | Schaefer ................................ 15/320 |
| 3,465,841 | 9/1969 | Pulskamp et al. ............... 200/157 X |
| 3,823,616 | 7/1974 | Houseman et al. ............. 200/157 X |
| 3,823,791 | 7/1974 | Sheler .................................... 180/6.66 |
| 3,857,076 | 12/1974 | Hetland ........................... 318/295 X |
| 3,971,973 | 7/1976 | Nakano ............................ 318/257 X |
| 4,173,056 | 11/1979 | Geyer ..................................... 15/320 |

*Primary Examiner*—J. V. Truhe
*Assistant Examiner*—W. Duncanson
*Attorney, Agent, or Firm*—Christel, Bean & Linihan

[57] ABSTRACT

A mechanism for controlling the speed and direction of a self-propelled machine, such as, for example, a floor cleaning machine, or the like. A rotatable control handle is provided and includes a speed control cam which moves a variable resistor slide member by means of a speed control arm connected to the cam follower. The variable resistor is connected between a battery power source and a propulsion motor to control the voltage to a speed control. The handle has a neutral position at which the machine is stationary, and rotation of the handle about its own axis in either direction will cause the motor to move the machine, the direction of rotation determining the direction of movement. The control handle carries a series of direction control cams which operate switches to control the direction of flow of current to the motor and thereby the direction in which the machine moves.

14 Claims, 5 Drawing Figures

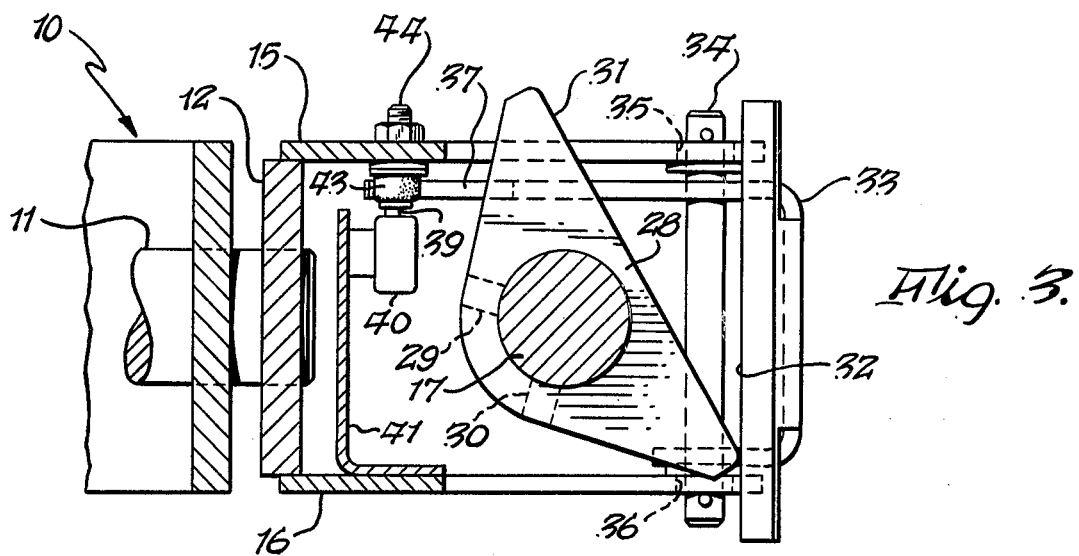

SPEED AND DIRECTION CONTROL MECHANISM

BACKGROUND OF THE INVENTION

This invention relates to control mechanisms, and more particularly to an improved speed and direction control mechanism for a self-propelled, wheeled device which is adapted to be independently steered, either manually or by power assisted means.

Various types of wheeled, self-propelled machines are known wherein the power source provides the propulsion means to propel the machine in a forward or backward direction and at a speed selected by the operator. Such machines can either be manually steered or they can be steered by some power assisted means. Examples of such self-propelled machines are floor cleaning machines, lawn mowers, and the like. Many such machines involve the use of multiple handles to separately control the speed of operation and the direction of the machine. Oftentimes those controls consist of mechanical linkages in the form of control cables from the various handles and knobs to the power source, or to a control system or device associated with the power source. Such mechanical linkages can result in additional complication in such devices, both from the standpoint of maintenance and from the standpoint of operation, where a number of separate handles, knobs, and the like are provided, and for each particular function and direction of movement.

It is an object of the present invention to overcome those shortcomings, to provide a simplified speed and direction control mechanism for a self-propelled machine, and to combine both speed and direction functions in a single, movable element.

SUMMARY OF THE INVENTION

Briefly stated, in accordance with one aspect of the present invention, a speed and direction control mechanism is provided for a self-propelled machine incorporating a propulsion motor and a power source. The system includes a rotatable control handle supported in a frame, the handle extending laterally and being grippable by either one or two hands of a machine operator. A speed control means is provided to control the speed of the propulsion motor and is responsive to the angular position of the control handle. Switch actuation means are carried by the handle and serve to operate switch means in response to the direction of rotation and the angular position of the control handle to cause the propulsion motor to propel the machine in a predetermined direction.

BRIEF DESCRIPTION OF THE DRAWINGS

FIG. 3 is a fragmentary cross-sectional view taken along the line 3—3 of FIG. 1.

FIG. 4 is a fragmentary cross-sectional view taken along the line 4—4 of FIG. 1.

FIG. 5 is a schematic diagram showing the electrical circuitry associated with the control mechanism of the present invention.

DESCRIPTION OF THE PREFERRED EMBODIMENTS

Figure 1:
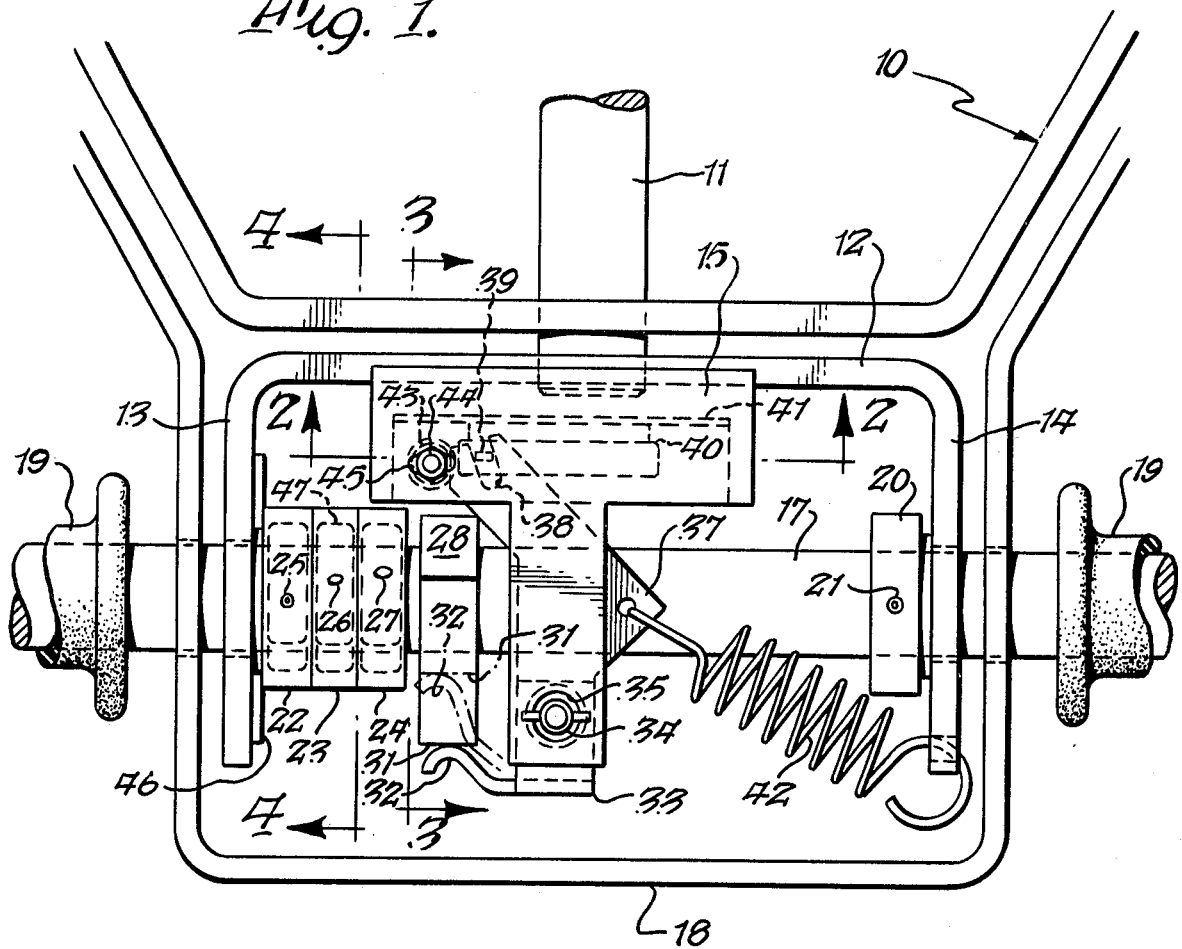
FIG. 1 is a top plan view of a control mechanism in accordance with the present invention.

Referring now to the drawings and particularly to FIG. 1 thereof, there is shown a portion of a machine frame 10 which, for example, could be a frame for a self-propelled, battery powered floor cleaning machine such as the machine shown in copending application Ser. No. 186,420, filed Sept. 12, 1980, and entitled, "Automatic Floor Cleaning Machine", which is assigned to the assignee of the present invention. Extending through and connected to frame 10 of the machine is a supporting column 11. Rigidly connected to supporting column 11 is a yoke member which includes a front wall 12, a left arm 13, and a right arm 14, and to which are attached, as, for example, by means of welding, an upper support plate 15 and a lower support plate 16 (see FIG. 2), each of which can be of a "T" configuration as shown, or it can be of any other configuration consistent with its function.

Rotatably carried in yoke arms 13, 14 is a handle in the form of a control shaft 17, which extends through and beyond an outer housing 18 within which the yoke member and its associated parts can be positioned. A portion of control shaft 17 extends beyond outer housing 18 and can have resilient gripper members 19 attached thereto for convenience and ease of use of the mechanism. Control shaft 17 is restrained from axial movement in one direction by means of an axial positioning collar 20 adjacent right arm 14 of the yoke member, which collar is held in position on shaft 17 by means of a set screw 21. Adjacent left arm 13 of the yoke member is a group of three side-by-side direction cams 22, 23, and 24, the functions of which will be hereinafter explained, each of which is held in position by set screws 25, 26, and 27, respectively. The outermost direction cam 25 and axial positioning collar 20 abut yoke left arm 13 and yoke right arm 14, respectively, and together they serve to restrain control shaft 17 from axial movement relative to housing 18.

Also attached to control shaft 17 is a speed control cam 28, which is best seen in FIG. 3. Speed control cam 28 is held in position on central shaft 17 by a pair of set screws 29, 30 and includes an elongated, flat cam surface 31. Preferably cam 28 is symmetrical about a longitudinal plane through the axis control shaft 17 and perpendicular to cam surface 31. Positioned against cam surface 31 is an elongated, flat, cam follower 32, which can have a curved face to provide linear contact with cam surface 31. Cam follower 32 preferably has a length at least as long as the length of cam surface 31 and extends from a yoke-type cam follower frame 33 which, in turn, is rotatably supported by a support shaft 34. Support shaft 34 is received and supported in openings 35, 36 formed in upper and lower support plates 15, 16, respectively, and can be restrained from axial movement by means of cotter pins (not shown), or the like. Extending from one of the yoke arms of cam follower frame 33 is a speed control lever 37, which extends forwardly of and over control shaft 17 and in a plane generally parallel to upper and lower support plates 15 and 16.

Figure 2:
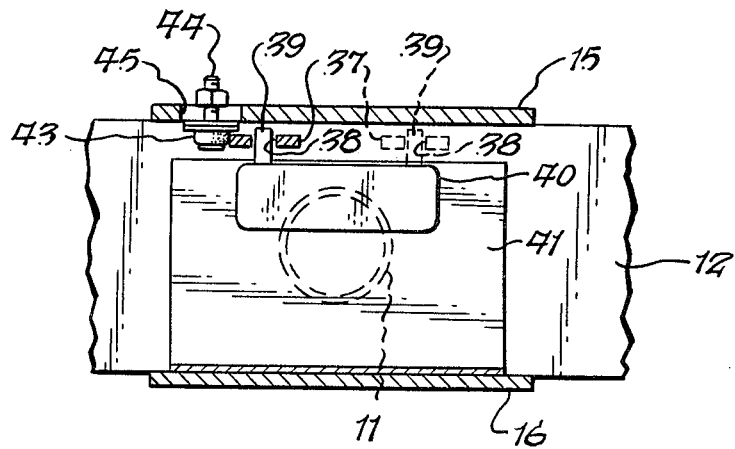
FIG. 2 is a fragmentary cross-sectional view taken along the line 2—2 of FIG. 1.

As seen more clearly in FIGS. 1 and 2, speed control lever 37 includes at its outer edge a slot 38, which engages with a slide tab 39 on a variable resistor 40, which, in turn, is positioned between upper and lower support plates 15, 16 and is mounted on a mounting bracket 41 which is secured to lower support plate 16

(see FIG. 3). A tension spring 42 is provided, one end of which is connected to speed control lever 37 and the other end of which is connected to yoke right arm 14. As best seen in FIG. 2, a stop member 43 is secured to upper support plate 15 by means of a bolt 44 and is so positioned as to limit the extent of travel of speed control lever 37 to avoid exceeding the limit of travel of slide tab or linearly movable input element 39. Bolt 44 passes through a slot 45 in upper support plate 15 and its position can be adjusted along slot 45 to conform with the maximum travel of slide tab 39 to thereby prevent damage to tab 39 or to resistor 40 from forced overtravel.

As noted above, three direction cams are carried by the control shaft, a forward cam 22, a reverse cam 23, and a forward bypass cam 24. Each of the direction cams is adapted to operate a single pole, normally open switch to control whether the machine operates in a forward direction or in a reverse direction. The structural arrangement of the direction cams and their associated switches is shown most clearly in FIG. 4 wherein reverse cam 23 is shown mounted to control shaft 17 by means of set screw 26. Positioned below cam 23 and mounted on a bracket 46 is a single pole, normally open switch 47 which includes an outwardly biased roller contact 48 which rides against cam 23. When central shaft 17 is rotated in a counterclockwise direction as viewed in FIG. 4, cam 23 will urge roller contact 48 downwardly against switch contact 49 to close the switch and thereby permit a portion of the electrical circuit, to be hereinafter described, to become operative. Slots 50, 51 are provided in mounting bracket 46 for adjustment of the orientation of switch 47 and the bracket is secured in position by means of bolts 52, 53. Although shown in FIG. 4 and described in terms of the operation of reverse cam 23, similar switch arrangements are provided for the forward and forward bypass cams 22, 24, respectively, shown in FIG. 1.

The electrical components of the mechanism are shown in FIG. 5 wherein the power source is a 36 volt DC battery 54, which can consist of six 6-volt batteries connected in series. A key operated switch 55 is provided as the main on-off control for the system, and a fuse 56 is positioned in series with switch 55 for overload protection. Connected in series with switch 55 are three parallel branch circuits, each of which incorporates a normally open, single pole switch 57, 47, 59, respectively, which is actuated by one of directional cams 22, 23, or 24, respectively. As one or more of the respective switches 57, 47, or 59 is closed, a relay coil connected thereto, 60, 61, and 62, respectively, is energized, thereby controlling the flow of current to a propulsion motor 63 through the relay contacts associated with the particular relay that is activated.

The control circuit for propulsion motor 63 is connected across battery 54 and a circuit breaker 64 is provided in series with the propulsion motor circuit for overload protection. The power from battery 54 is conveyed to motor 63 based upon which of relay coils 60, 61, or 62 has been activated. Connected in series with motor 63 and circuit breaker 64 is an electronic speed control 64a, the output of which is controlled by the position of slide tab 39 of speed control resistor 40. The position of slide tab 39 is determined by the position of speed control lever 37 which, in turn, is controlled by the angular position of control shaft 17. A suitable speed control for use in the embodiment shown and described herein is the DC variable speed motor control manufactured and sold by Dart Controls, Inc., of Zionsville, Ind. under Model No. 65ADC45. The variable voltage output from speed control resistor 40 controls the variable voltage output of speed control 64a and passes either through relay contacts 65 and 66a or through relay contacts 66 and 65a, as will hereinafter be described in more detail in connection with the operation of the device. Contacts 65a and 66a are normally closed and contacts 65 and 66 are normally open.

Although the invention is illustrated and described herein in terms of the use of a variable resistor, wherein the resistance is varied by linear movement of a slide member, it will be apparent to those skilled in the art that a rotary variable resistor could also be employed, and that suitable gearing or other drive means could be provided to permit actuation of such a rotary variable resistor by the control shaft. Similarly, instead of a variable resistor, as part of a circuit, an AC control circuit utilizing a variable capacitor or a variable inductance, such as, for example, a linear variable differential transformer, could also be employed with appropriate circuitry.

In operation, control shaft 17 is initially in a neutral position in which speed cam surface 31 is parallel to the axis of support shaft 34. As shown in dashed lines in FIG. 1, cam follower 32 is in the position closest to the central axis of control shaft 17, which is the position to which spring 42 will urge cam follower 32, and also control shaft 17, unless the spring force is overcome by manually rotating control shaft 17. Thus, in addition to causing cam follower 32 to bear against and follow speed cam 28, spring 42 also serves as a centering device to maintain speed cam 28 and control shaft 17 in the neutral position and thereby prevents inadvertent motion of the machine.

As control shaft 17 is rotated in a counterclockwise direction (as viewed in FIG. 3), speed cam 28 moves from the position in which cam surface 31 is parallel to the axis of support shaft 34 and assumes the position shown in FIG. 3, thereby urging cam follower 32 away from the axis of control shaft 17 and in a rearward direction with respect to machine frame 10, as also shown in solid lines in FIG. 1. When cam follower 32 is in that position, speed control lever 37, which is attached thereto, has rotated about the axis of support shaft 34 and has moved slide tab 39 of variable resistor 40 from right to left, as viewed in FIG. 1, which corresponds with the full speed position. At that position, speed control lever 37 is restrained from further movement by stop member 43 (see FIG. 2) to prevent damage to variable resistor 40.

In addition to having rotated speed cam 28, the rotation of control shaft 17 also has caused direction cams 22, 23, and 24 to rotate. Because of the positioning of the direction cams 22, 23, and 24 and their associated switches 57, 47 and 59 (shown in FIG. 5), the rotation described above has caused forward direction cam 22 to rotate to the point where its associated switch 57 has closed, thereby closing the circuit for the forward speed mode, energizing relay 60, and reversing the state of contacts 65 and 65a, causing contacts 65 to close and contacts 65a to open, thereby providing a circuit through contacts 65 and 66a and permitting current flow through motor 63 to propel the machine in a forward direction.

As control handle 17 is rotated counterclockwise to the full extent of its travel, speed control lever 37 has reached the full speed position and forward bypass cam 24 has rotated sufficiently to close its associated switch 59, thereby energizing relay 62 to close normally open contacts 68 and bypass speed control 64a. The full battery voltage is applied across motor 63 through switch 68, thereby providing maximum motor speed because the voltage drop across speed control 64a is eliminated.

Similarly, as control shaft 17 is permitted to rotate clockwise from its full speed position as shown in FIG. 3, speed cam 28 rotates clockwise and spring 42, which is under tension, pulls on speed control lever 37 to cause cam follower 32 to remain in contact with cam surface 31 of speed cam 28 throughout the full extent of its travel and to urge it to the neutral position. As clockwise rotation is continued, speed cam 28 ultimately reaches the neutral position wherein cam surface 31 is parallel to the axis of support shaft 34 and perpendicular to upper and lower support plates 15, 16, respectively.

As control shaft 17 is rotated further in a clockwise direction, beyond the neutral position, speed cam 28 again urges cam follower 32 in a rearward direction, thereby causing speed control lever 37 to again move slide tab 39 on variable resistor 40 in a direction from right to left as viewed in FIG. 1. Simultaneously, reverse direction cam 23 contacts its associated switch 48, thereby closing the circuit for the reverse speed mode, energizing relay 61, and reversing the state of contacts 66 and 66a, causing contacts 66 to close and contacts 66a to open, thereby providing a circuit through contacts 66 and 65a and reversing the current flow through motor 63, causing it to propel the machine in a reverse direction. Resistor 67 is provided in the reverse circuit to reduce the voltage applied to motor 63, thereby limiting the maximum speed which the machine can travel in the reverse direction.

When the mechanism is in the neutral position, the shallow portions of cams 25, 26, and 27 overlie their respective switches 57, 48, and 59 so that none of the switches is closed and thus none of relays 60, 61, and 62 is energized. The voltage across motor 63 is allowed to dissipate through normally closed contacts 65a and 66a, and also through resistor 67, which provides a dynamic braking effect on the machine. The degree of braking is regulated by the magnitude of the resistance provided by resistor 67.

It can thus be seen that the control mechanism hereinabove described provides a single handle control for convenient and accurate speed and direction control for a self-propelled machine, such as a floor cleaning machine, and it performs those functions without mechanical control cables. Although the speed control cam is capable of rotation in two directions, because it is symmetrical about a transverse axis, the rotation in either direction has the same effect on the speed control lever and operates it in the same direction. Additionally, the centering arrangement whereby the control handle is continually urged into the neutral position is integral with the speed cam and follower structure and does not require a separate spring solely for centering.

While particular embodiments of the invention have been illustrated and described, it will be apparent to those skilled in the art that various changes and modifications can be made without departing from the spirit and scope of the invention, and is intended to cover in the appended claims all such changes and modifications that fall within the scope of the present invention.

What is claimed is:

1. A speed and direction control mechanism for a self-propelled machine incorporating a propulsion motor to drive said machine, said control mechanism comprising:
   (a) a control handle rotatably supported in a frame and extending beyond said frame a distance sufficient to permit gripping thereof whereby said handle can be manually rotated;
   (b) speed control means responsive to the angular position of said control handle to vary the speed of said motor, said speed control means including a variable resistor connected to control the voltage applied across said motor;
   (c) drive means interconnecting said control handle and said variable resistor whereby rotation of said handle varies the resistance of said resistor to change the speed of said motor, said drive means comprising speed control cam means carried by said control shaft and cam follower means cooperable with said cam means, said cam follower means being connected to said variable resistor, so that the speed of said propulsion motor can be varied by the position of said cam means;
   (d) switch actuation means carried by said control handle and rotatable therewith; and
   (e) switch means responsive to the position of said switch actuation means to close a circuit and permit current to flow in a predetermined direction to said propulsion motor, whereby to permit movement of said machine in a given direction.

2. The control mechanism of claim 1 wherein said variable resistor includes a linearly movable slide member to vary the resistance thereof.

3. The control mechanism of claim 2 wherein said cam follower means comprises a cam follower in engagement with said cam means and an integral speed control arm cooperable with said slide member of said variable resistor.

4. The control mechanism of claim 3 wherein said cam means comprises a cam secured to said central handle for rotation therewith, said cam having a flat camming surface.

5. The control mechanism of claim 4 wherein said cam follower includes a surface in linear contacting engagement with said flat camming surface of said cam to define a neutral position wherein no propulsive effort is applied to said machine.

6. The control mechanism of claim 5 wherein said cam follower means includes biasing means to urge said cam follower into continuous contact with said cam whereby said cam and cam follower are urged into a neutral position.

7. The control mechanism of claim 6 wherein said cam follower and said integral speed control arm are secured for rotation about an axis perpendicular to and spaced from the axis of said control handle, and said arm includes means engageable with said linearly movable slide member to move the same through the full extent of its path of travel.

8. The control mechanism of claim 7 including adjustable stop means to limit the extent of movement of said speed control arm.

9. A speed control mechanism for a self-propelled machine incorporating a propulsion motor to drive said machine, said control mechanism comprising:
   a control handle rotatably supported in a frame and extending beyond said frame a distance sufficient to permit gripping thereof whereby said handle can be manually rotated between low speed and high speed positions;

a speed control including a linear movable input element operable to vary the speed of said motor; and means interconnecting said control handle with said linear movable input element whereby rotation of said handle moves said input element in a linear manner, said means including a speed control cam carried by said control handle and having a first elongated surface, and a cam follower cooperable with said speed control cam and having a second elongated surface which cooperates with the first elongated surface, said cam follower being movable between low speed and high speed positions and being interconnected to said input element so that the speed of said propulsion motor can be varied by the position of the speed control cam.

10. The speed control mechanism as set forth in claim 9 further characterized by the provision of biasing means operable to bias the cam follower towards its low speed position to in turn return the control handle to its low speed position.

11. The speed control mechanism as set forth in claim 9 in which the propulsion motor is an electric motor, and said linear movable input element is a linear variable resistor which controls the voltage applied across said motor.

12. The speed control mechanism as set forth in claim 9 wherein said cam follower is carried for pivotal movement about an axis lying in a plane transverse to the axis of the control handle.

13. The speed control mechanism as set forth in claim 12 wherein said cam follower includes a portion lying in a plane parallel to the axis of said control handle and generally at right angles to the axis of rotation of the cam follower and the first elongated surface, said portion having a slotted end which engages the linear movable input element.

14. The speed control mechanism as set forth in claim 13 in which said portion is engaged by a spring in such a manner that the cam follower is biased for rotation about its axis to force the second elongated surface towards said first elongated surface.

* * * * *